US008619419B2

(12) United States Patent
Zimmermann et al.

(10) Patent No.: US 8,619,419 B2
(45) Date of Patent: Dec. 31, 2013

(54) COMPUTER DOCKING STATION

(75) Inventors: Augusto Jose Pereira Zimmermann, Joinville-Sc (BR); Fabricio Caldeira Possamai, Joinville-Sc (BR); Otavio Santini, Jr., Joinville-Sc (BR)

(73) Assignee: Whirlpool S.A., São Paulo -Sp, (BR)

( * ) Notice: Subject to any disclaimer, the term of this patent is extended or adjusted under 35 U.S.C. 154(b) by 116 days.

(21) Appl. No.: 12/678,092

(22) PCT Filed: Sep. 16, 2008

(86) PCT No.: PCT/BR2008/000283
§ 371 (c)(1),
(2), (4) Date: Jul. 14, 2010

(87) PCT Pub. No.: WO2009/036542
PCT Pub. Date: Mar. 26, 2009

(65) Prior Publication Data
US 2010/0309622 A1    Dec. 9, 2010

(30) Foreign Application Priority Data

Sep. 18, 2007   (BR) ..................................... 0704566

(51) Int. Cl.
*H05K 7/20*    (2006.01)
*G06F 1/20*    (2006.01)
*G06F 1/16*    (2006.01)

(52) U.S. Cl.
USPC ............ 361/679.47; 361/679.41; 361/679.48; 361/679.49; 361/679.5; 361/699; 361/700; 361/701

(58) Field of Classification Search
USPC ............ 361/679.41, 679.47, 679.48, 679.49, 361/679.5, 699–701
See application file for complete search history.

(56) References Cited

U.S. PATENT DOCUMENTS

| 5,175,671 | A | * | 12/1992 | Sasaki ...................... 361/679.43 |
| 5,313,362 | A | * | 5/1994 | Hatada et al. ................. 361/709 |
| 5,323,847 | A | * | 6/1994 | Koizumi et al. ......... 165/104.33 |
| 5,448,897 | A | * | 9/1995 | Dinh .............................. 62/333 |
| 5,559,673 | A | * | 9/1996 | Gagnon et al. ................ 361/695 |
| 5,704,212 | A | * | 1/1998 | Erler et al. ....................... 62/3.2 |
| 5,706,668 | A | * | 1/1998 | Hilpert ......................... 62/259.2 |
| 5,768,101 | A | * | 6/1998 | Cheng ..................... 361/679.41 |
| 5,959,836 | A | * | 9/1999 | Bhatia ..................... 361/679.41 |
| 5,974,556 | A | * | 10/1999 | Jackson et al. ................ 713/322 |
| 6,084,769 | A | * | 7/2000 | Moore et al. ............. 361/679.47 |
| 6,094,347 | A | * | 7/2000 | Bhatia .......................... 361/695 |

(Continued)

FOREIGN PATENT DOCUMENTS

KR    20040107552 A    12/2004

*Primary Examiner* — Anatoly Vortman
(74) *Attorney, Agent, or Firm* — Gifford, Krass, Sprinkle, Anderson & Citkowski, P.C.

(57) ABSTRACT

The docking station (10) comprises a casing (11) presenting an air inlet (12) and a cooled air outlet (13) and housing a refrigeration system (30) for cooling an air flow which is caused to pass through the interior of the casing (11), from the air inlet (12) to the cooled air outlet (13). The refrigeration system (30) comprises: a compressor (31) pumping refrigerant fluid through a refrigeration circuit comprising a condenser (32) and an evaporator (33) and, preferably, a ventilation means (34) producing said air flow which is conducted through the evaporator (33) to be cooled thereby and released, through said cooled air outlet (13), to the interior of a computer (20) seated against the docking station (10).

12 Claims, 7 Drawing Sheets

(56) References Cited

U.S. PATENT DOCUMENTS

| | | | |
|---|---|---|---|
| 6,109,039 A * | 8/2000 | Hougham et al. | 62/3.7 |
| 6,118,654 A * | 9/2000 | Bhatia | 361/679.52 |
| 6,172,871 B1 * | 1/2001 | Holung et al. | 361/679.47 |
| 6,181,553 B1 * | 1/2001 | Cipolla et al. | 361/679.54 |
| 6,191,943 B1 * | 2/2001 | Tracy | 361/679.46 |
| 6,239,970 B1 * | 5/2001 | Nakai et al. | 361/695 |
| 6,313,987 B1 * | 11/2001 | O'Connor et al. | 361/679.46 |
| 6,343,010 B1 * | 1/2002 | Tanaka | 361/679.47 |
| 6,362,959 B2 * | 3/2002 | Tracy | 361/679.47 |
| 6,453,378 B1 * | 9/2002 | Olson et al. | 710/304 |
| 6,522,535 B1 * | 2/2003 | Helot et al. | 361/679.49 |
| 6,542,360 B2 * | 4/2003 | Koizumi | 361/679.47 |
| 6,574,102 B2 * | 6/2003 | Usui et al. | 361/679.48 |
| 6,646,874 B2 * | 11/2003 | Pokharna et al. | 361/679.09 |
| 6,691,197 B2 * | 2/2004 | Olson et al. | 710/304 |
| 6,819,563 B1 * | 11/2004 | Chu et al. | 361/696 |
| 6,822,856 B2 * | 11/2004 | Fujiwara | 361/679.48 |
| 6,837,057 B2 * | 1/2005 | Pokharna et al. | 62/3.2 |
| 6,845,008 B2 * | 1/2005 | Pokharna et al. | 361/690 |
| 6,865,077 B2 * | 3/2005 | Igarashi | 361/679.21 |
| 6,997,006 B2 * | 2/2006 | Kameyama et al. | 62/259.2 |
| 7,148,589 B2 * | 12/2006 | Nishigaki et al. | 307/413 |
| 7,269,005 B2 * | 9/2007 | Pokharna et al. | 361/679.48 |
| 7,342,783 B2 * | 3/2008 | Park | 361/679.48 |
| 7,388,745 B2 * | 6/2008 | DeLuga et al. | 361/690 |
| 7,472,215 B1 * | 12/2008 | Mok et al. | 710/304 |
| 7,480,140 B2 * | 1/2009 | Hara et al. | 361/692 |
| 7,660,109 B2 * | 2/2010 | Iyengar et al. | 361/679.47 |
| 7,660,930 B2 * | 2/2010 | Mok et al. | 710/304 |
| 7,855,890 B2 * | 12/2010 | Kashirajima et al. | 361/700 |
| 7,872,864 B2 * | 1/2011 | Mongia et al. | 361/695 |
| 8,000,099 B2 * | 8/2011 | Parker | 361/679.48 |
| 2001/0033475 A1 * | 10/2001 | Lillios et al. | 361/687 |
| 2003/0123223 A1 | 7/2003 | Pokharna et al. | |
| 2004/0027798 A1 * | 2/2004 | Fujiwara | 361/687 |
| 2006/0133031 A1 | 6/2006 | Hara et al. | |

* cited by examiner

COMPUTER DOCKING STATION

CROSS-REFERENCE TO RELATED APPLICATIONS

This application is the U.S. national phase of PCT/BR2008/000283 filed Sep. 16, 2008, which claims priority of Brazil Patent Application PI0704566-2 filed Sep. 18, 2007, which is incorporated herein by reference.

FIELD OF THE INVENTION

The present invention relates to a docking station, presenting a refrigeration system, particularly used for cooling components in compact electronic appliances, such as a laptop or notebook type computer, and the like.

BACKGROUND OF THE INVENTION

The electronic equipment in general, particularly computers, including the portable ones, such as laptops and notebooks, include electronic components, such as microprocessors and integrated circuits which, to properly function, require that their temperature be maintained within a certain temperature range, and which also guarantees the maintenance of the operational features of these electronic components.

Due to the technological advances, mainly regarding the processing speed of these electronic components, problems, such as superheating and heat dissipation in equipment using such electronic components, have been more and more a limitation factor for the good performance of these electronic components and represent one of the great obstacles to the improvement of such equipment. Besides the processors, the integrated circuits of the computers also require an acceptable temperature range, beyond which the operation of said integrated circuits and of the other circuits coupled thereto, can be compromised, causing operation failures. A high temperature in computers may also be a risk of injury for the user.

Traditional refrigeration systems (radiation or convection) do not provide an efficient refrigeration of the more sensitive electronic components.

The increase of heat generation of electronic components in computers is generally accompanied by a greater demand of the refrigeration system to dissipate this heat. In the case of portable computers, generally presenting a screen element coupled to a base in which are mounted the electronic circuits, keyboards, cable connection terminals, the relatively reduced size of the computers makes difficult, not only the heat dissipation, but also the use of refrigeration systems which require a larger installation space, usually not available in this type of computers.

As a consequence of these inconveniences, the electronic equipment industry has adopted refrigeration solutions for computers, such as those discussed in U.S. Patents and U.S. Patent Applications U.S. Pat. No. 4,434,625, U.S. Pat. No. 5,365,749, US2005/0123418, U.S. Pat. No. 5,969,939, U.S. Pat. No. 6,181,553, U.S. Pat. No. 6,415,612, U.S. Pat. No. 6,628,520, U.S. Pat. No. 6,687,123, U.S. Pat. No. 6,826,047 and U.S. Pat. No. 6,950,303, none of them being applicable to portable computers, i.e., with reduced dimensions, and more disclosing a refrigeration system utilizing a phase change refrigerant fluid as a cooling means of a forced-air flow to be directed to the electronic components to be cooled.

In addition to these solutions, document U.S. Pat. No. 6,837,057 presents a refrigeration system mounted in a docking station and using a thermoelectric element for cooling a forced-air flow to be directed to the electronic components of a computer coupled to the docking station. in this previous solution, the forced-air flow is blown by a fan and caused to pass through a cool face of a thermoelectric element, to be cooled and directed to the base of the docked computer and a forced-air flow is passed through a heating face of this thermoelectric element and directed away from the computer. In this prior art solution, the cooled air is directed, from the cool face of the thermoelectric element to the base of the computer, through a duct provided in the docking station.

Despite improving the cooling efficiency of the portable computers, without requiring increasing the dimensions, weight and power supply thereof, such prior art solution presents the drawback of low heat exchange efficiency and applicability limitations.

SUMMARY OF THE INVENTION

It is an object of the present invention to provide a computer docking station, which presents an efficient refrigeration of the hot regions of said computer, through a compact refrigeration system operating with a high energetic yield.

A further object of the present invention is to provide a computer docking station such as cited above and which permits aggregating a plurality of peripherals to be energized and operated together with the computer coupled to the docking station.

These and other objects of the present invention are achieved by the provision of a computer docking station, comprising a casing presenting an air inlet, which is open to an external environment, and a cooled air outlet, and housing a refrigeration system for cooling an air flow which is caused to pass through the interior of the casing, from the air inlet to the cooled air outlet, said refrigeration system comprising: a compressor pumping a refrigerant fluid through a refrigeration circuit comprising a condenser and an evaporator, through which is caused to pass the air flow to be cooled, the cooled air outlet being positioned to direct the cooled air flow to the interior of a computer seated against the docking station.

The air flow to be directed to the computer is produced by a ventilation means typically positioned in the interior of the casing, but which can be also produced by the ventilation means existing in the interior of the computer.

The ventilation means may further provide an additional air flow, which is passed through the condenser and the compressor, so as to be directed to a hot air outlet of the casing, guaranteeing a more efficient cooling of both the condenser and the compressor housed in the casing.

BRIEF DESCRIPTION OF THE DRAWINGS

The invention will be described below, with reference to the enclosed drawings, given by way of example of a construction of the invention and in which.

DETAILED DESCRIPTION OF THE PREFERRED EMBODIMENTS

The present invention describes a docking station 10 for a computer 20, for example of the portable type, said docking station 10 being constructed to provide cooling of the computer 20 received therein, particularly the electronic components provided in the interior of the computer 20. The present solution should not be considered restrictive to docking stations, being also applied to correlative devices (such as "port replicators").

Figure 1A:
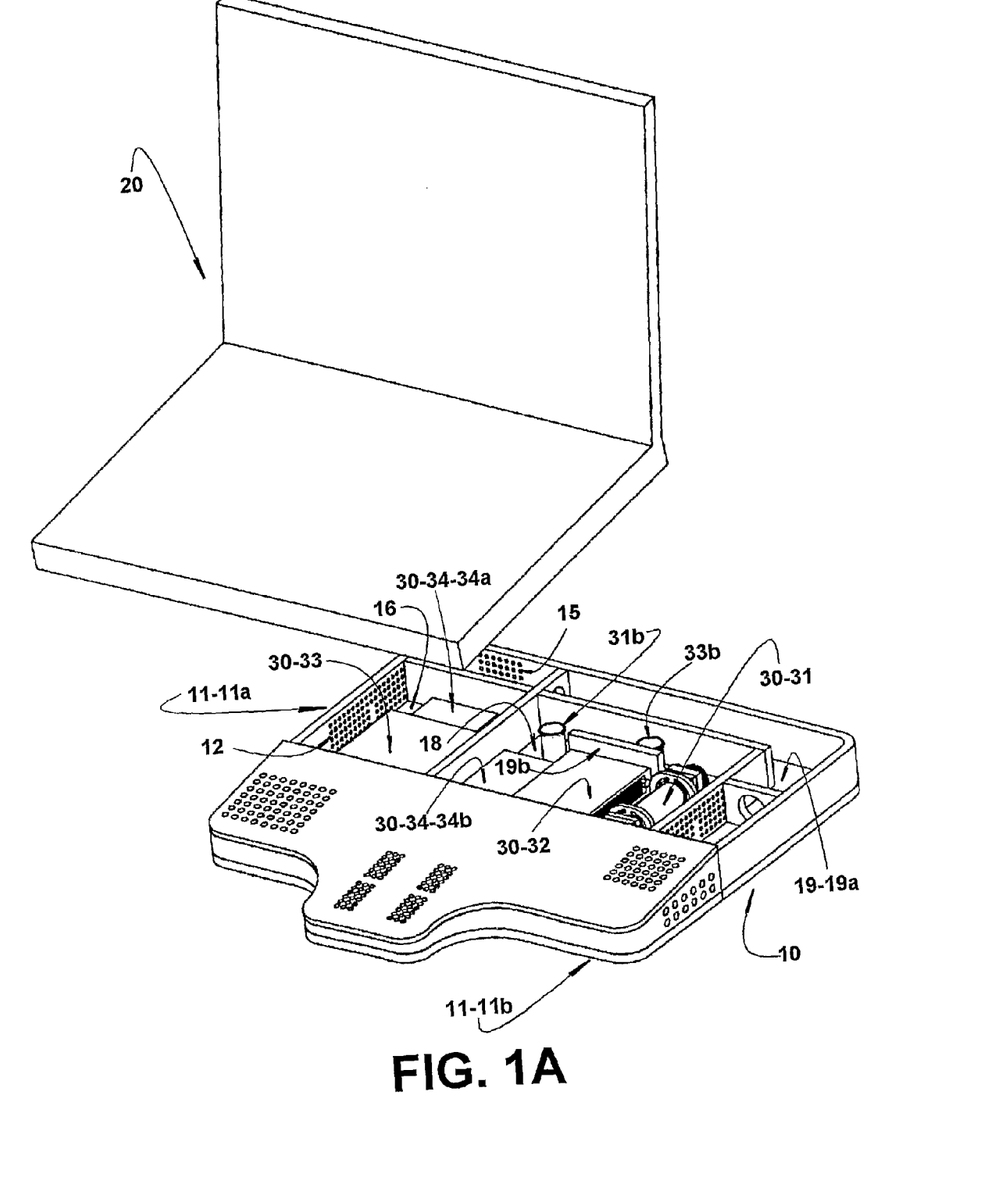
FIG. 1A schematically represents an exploded front perspective view of a docking station and a computer to be coupled thereto.
Figure 1B:
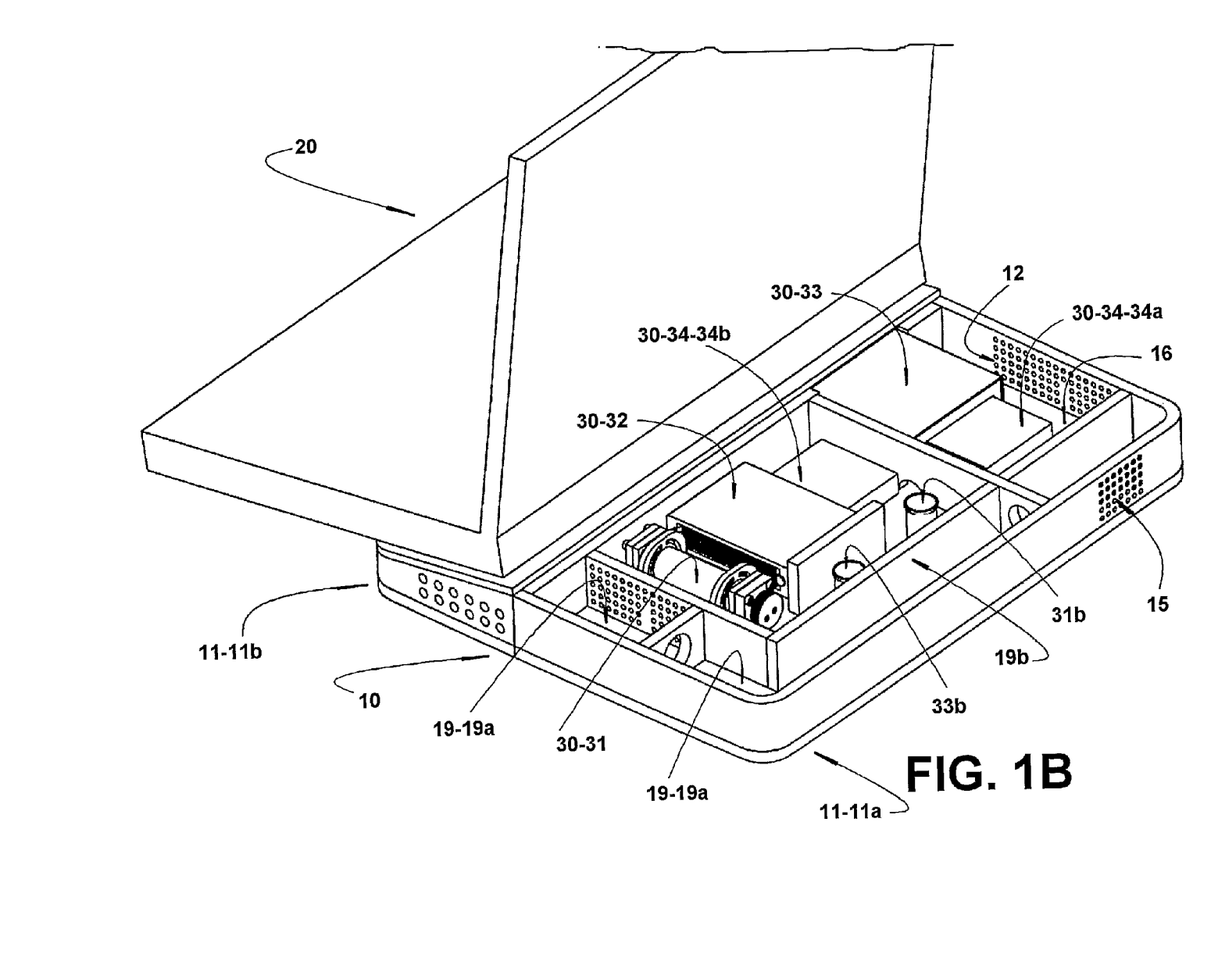
FIG. 1B schematically represents a rear top perspective view of the docking station partially sectioned and receiving a computer.
Figure 2:
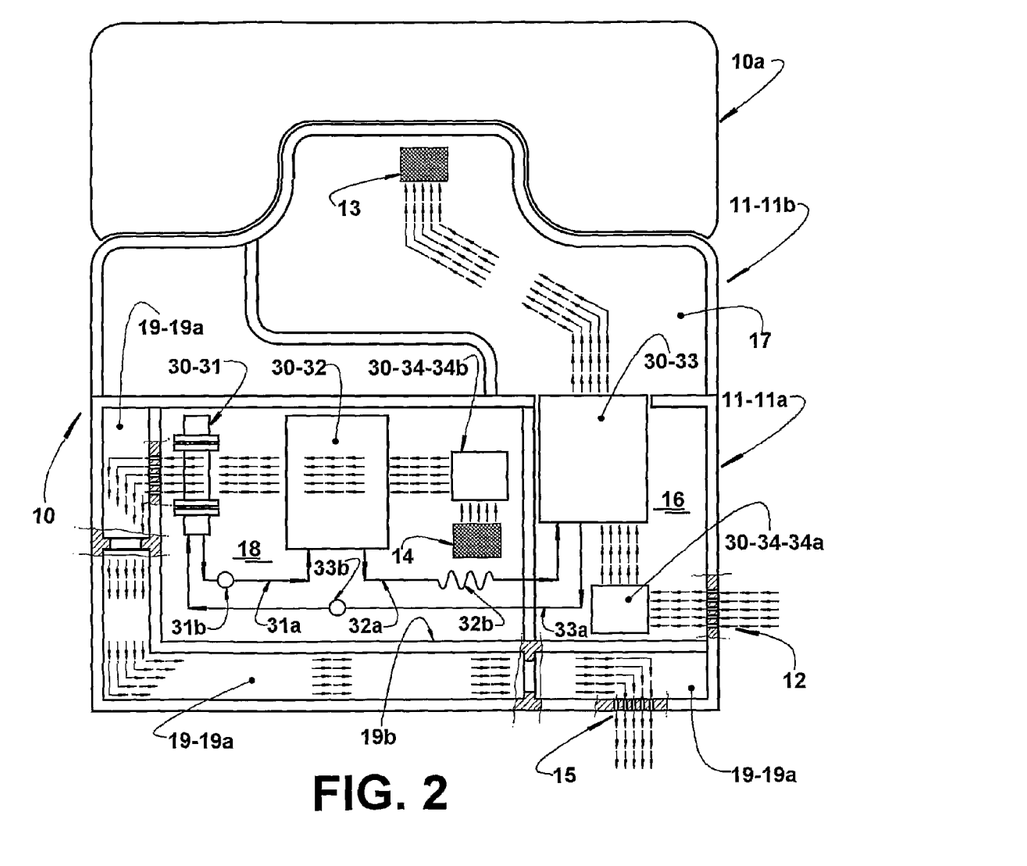
FIG. 2 schematically represents the docking station in which is provided a refrigeration system constructed in accordance with a first embodiment of the present invention, in which the ventilation means is internal to the casing and illustrating, by means of arrows, the air flows passing through the interior of the docking station.

The docking station 10 is provided with a casing 11 constructed of, metallic or synthetic material, presenting an air inlet 12, which is open to an external environment, and a cooled air outlet 13. In a constructive option, such as that illustrated in FIGS. 2, 2A and 4, the casing 11 is also provided with an additional air inlet 14, preferably disposed interiorly to the casing 11, and a hot air outlet 15, as will be described.

With the provision of the additional air inlet 14 interiorly of the casing 11, the latter should be provided with feet (not illustrated) to allow the formation of an air intake region interior to the casing 11, which may be further provided with front and side small skirts (not illustrated), so that the air intake take place in the rear lower region of the casing 11, preventing the transmission of noise from the interior of the casing 11 directly to the user.

According to the present invention, the docking station 10 houses, in its casing 11, a refrigeration system 30 for cooling an air flow passed through the interior of the casing 11, from the air inlet 12 to the cooled air outlet 13.

According to the present invention, the refrigeration system 30 is of the type using mechanical compression of a refrigerant fluid in gaseous state, as illustrated in the enclosed drawings (similar to the household refrigeration systems, such as refrigerators and air conditioners).

The refrigeration system 30 comprises: a compressor 31 pumping refrigerant fluid through a refrigeration closed circuit comprising a condenser 32 and an evaporator 33. The compressor 31 has its discharge connected to an inlet of the condenser 32 by a first duct 31a passing through a discharge muffling chamber 31b. The condenser 32 has its outlet connected to an inlet of the evaporator 33 by means of a second duct 32a provided with a capillary portion 32b or any other adequate restricting device. The outlet of the evaporator 33 is connected to the suction of the compressor 31 by means of a third duct 33a passing through a suction muffling chamber 33b.

Figure 4:
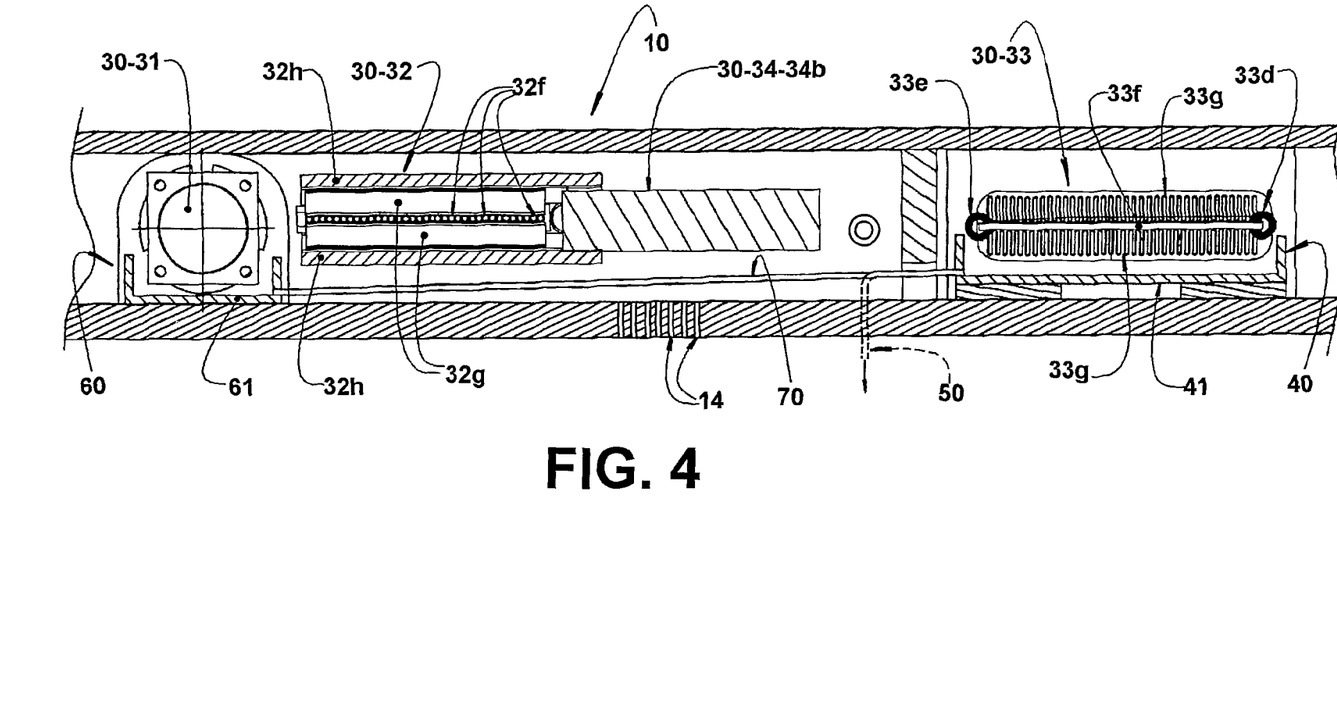
FIG. 4 represents a cross-sectional view of the docking station, said section taken along line Iv-Iv of FIG. 3.
Figure 5:
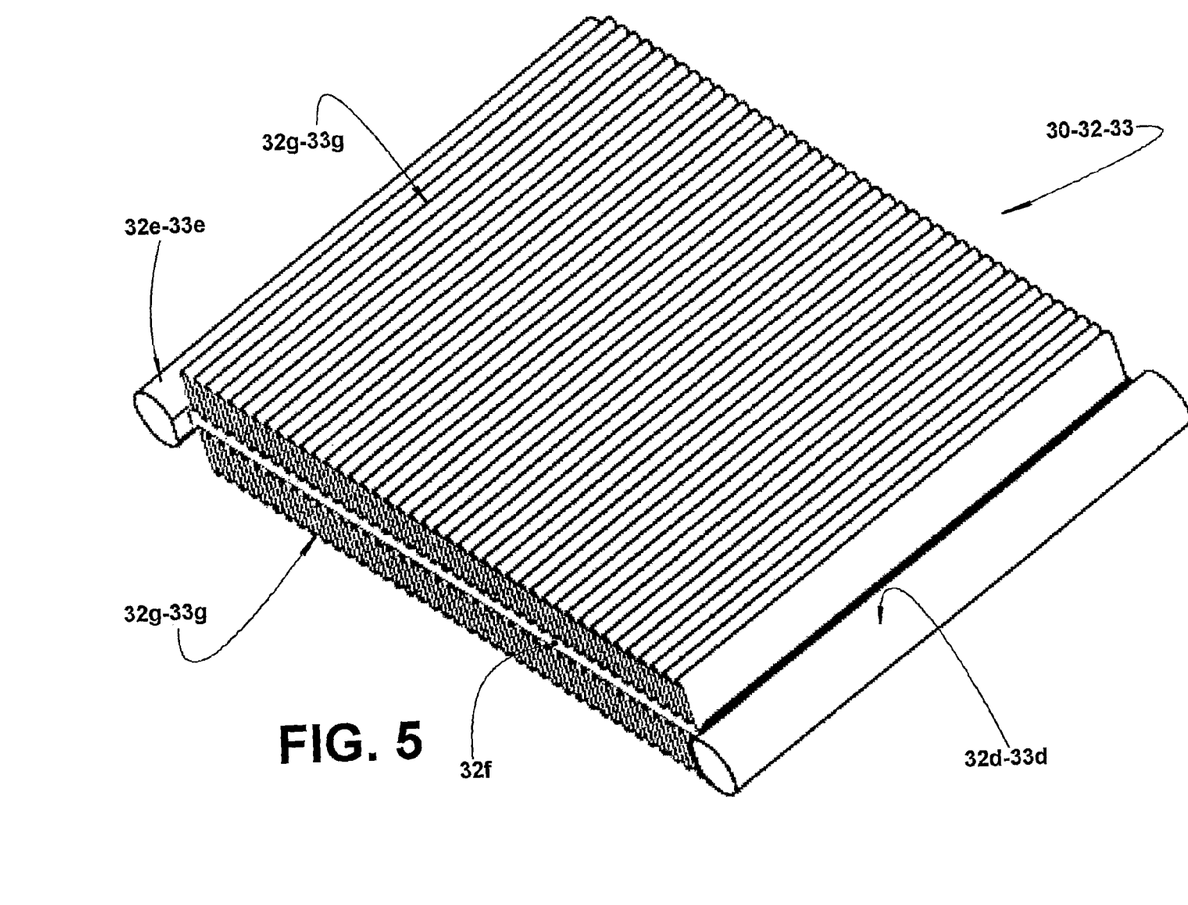
FIG. 5 represents somewhat schematically, a partially sectioned perspective view of a possible exemplary construction for the evaporator and the condenser of the refrigeration system.

The condenser 32 and the evaporator 33 can be constructed in different manners well known by the prior art. In a construction form illustrated in FIG. 4, and more detailed in FIG. 5, these heat exchangers comprise an inlet collecting tube 32d, 33d, and an outlet collecting tube 32e, 33e, generally parallel to one another and interconnected by a plurality of transversal tubes 32f, 33f, to which are attached, usually by welding or brazing, upper and lower fins 32g, 33g disposed parallel to the inlet collecting tubes 32d, 33d and the outlet collecting tubes 32e, 33e and which may be formed, in each of the upper and lower sides of the transversal tubes 32f, 33f, by a respective single corrugately bent sheet metal. As illustrated in FIG. 4, the condenser 32 may be surrounded by a tubular cover 32h, to force the additional air flow to pass through its structure and towards the compressor 31.

The refrigeration system 30 further comprises, preferably, although not obligatorily, a ventilation means 34 producing the air flow which is conducted through the evaporator 33, to be cooled thereby, said cooled air outlet 13 being positioned in a way as to direct the cooled air flow to the interior of a computer 20 seated against the docking station 10.

According to the present invention, the casing 11 is provided with openings, some of them being disposed so as to be aligned with openings provided in the computer 20, so that, when the computer 20 is seated against or on the docking station 10, the opening alignment allows cooled air flow to be directed to the computer 20, through the openings thereof.

In the illustrated constructions, the docking station 10 comprises a first casing portion 11a, in which is housed the refrigeration system 30, and a second casing portion 11b, in which is seated the computer 20, so that its region to be cooled remains in contact with the cooled air outlet 13 of the casing 11. In the illustrated constructions, the cooled air outlet 13 is forward in the second casing portion 11b.

The docking station 10 can also include a support portion 10a, adjacent to the second casing portion 11b, opposite to the first casing portion 11a, and which receives and supports part of the computer 20.

According to another form of the present invention, the casing 11 includes the air inlet 12 placed on a side wall portion of the casing 11, the cooled air outlet 13 being provided in an upper wall of the casing 11, particularly in an upper wall of the second casing portion 11b. The hot air outlet 15 is provided in another side wall of the casing 11, spaced from the cooled air outlet 13 and, preferably, spaced from the air inlet 12. In another possible construction, the casing 11 is provided with a single air inlet. Although the illustrated constructions present the hot air outlet 15 spaced from the compressor 31, it should be understood that the present invention should not be limited to these constructions, since it is also possible to arrange the hot air outlet 15 in a wall of the casing 11 adjacent to the compressor 31. This construction (not illustrated) may be carried out in the situations in which it is not necessary to absorb noises caused by operation of the compressor 31. In the present solution, as will be described, the additional air inlet 14 and the hot air outlet 15 are provided considering the noise attenuation upon operation of the compressor 31.

In the solution of the present invention, the compressor 31 is of the linear type and, preferably, with variable speed (VCC), to permit an automatic adjustment of the refrigeration to be produced for cooling the computer 20. The linear compressor is of the type described in PCT patent applications PCT/BR2006/000286 and PCT/BR2007/000098.

According to the present invention, the ventilation means 34 provides, in addition to the air flow that passes through the evaporator 33 towards the cooled air outlet 13, an additional air flow which is passed through the condenser 32, through the compressor 31, to be directed to the hot air outlet 15 of the casing 11.

With this arrangement, the additional air flow allows increasing the condensation efficiency of the refrigerant fluid in the condenser, thereby increasing the cooling efficiency of the refrigeration system, as well as making the heat, generated by the compressor operation, to be directed outwards from the casing 11 of the docking station 10. However, it should be understood that the additional air flow can only pass through one of the parts of compressor 31 and condenser 32, in order to conduct the air heated by the respective part outwards from the casing 11.

In a way (not illustrated) of carrying out the present invention, the air conducted by the ventilation means 34 to the compressor 31 is admitted through the air inlet 12 of the casing 11, the ventilation means 34 thus producing both the air flow to be cooled and directed to the computer and an air flow caused to pass through the condenser 32 and/or through the compressor 31, to be expelled outwards from the casing 11 through the hot air outlet 15.

In the embodiment illustrated in FIGS. 1A, 1B, 2, 3 and 4, the ventilation means 34 comprises a first fan 34a producing the air flow that passes through the evaporator 33 and directed to the cooled air outlet 13 and a second fan 34b producing the additional air flow passing through the condenser 32 and through the compressor 31, in order to be directed to a hot air outlet 15 of the casing 11. It should be understood that both the first fan 34a and the second fan 34b can admit external air to the casing 11, through the air inlet 12 thereof or, in another option, the first fan 34a can draw air from the air inlet 12 and the second fan 34b can draw external air from the outside of the casing 11, through the additional air inlet 14. In this embodiment, the ventilation means 34 comprises a first fan 34a positioned inside the casing 11 and producing the air flow which is passed through the evaporator 33, to be directed to the cooled air outlet 13.

Figure 2A:
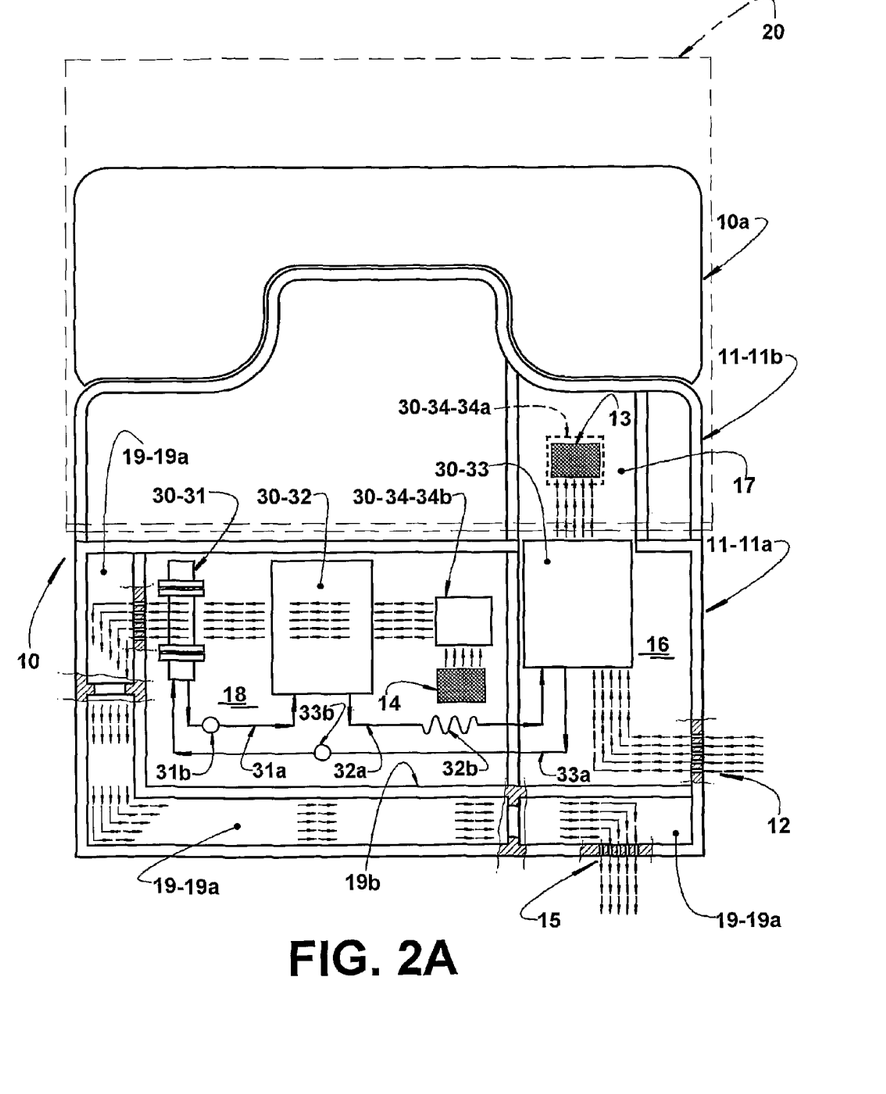
FIG. 2A schematically represents a second embodiment of the docking station illustrated in the previous figure and in which the ventilation means presents a first fan external to the casing and defined by a fan of the computer.
Figure 3:
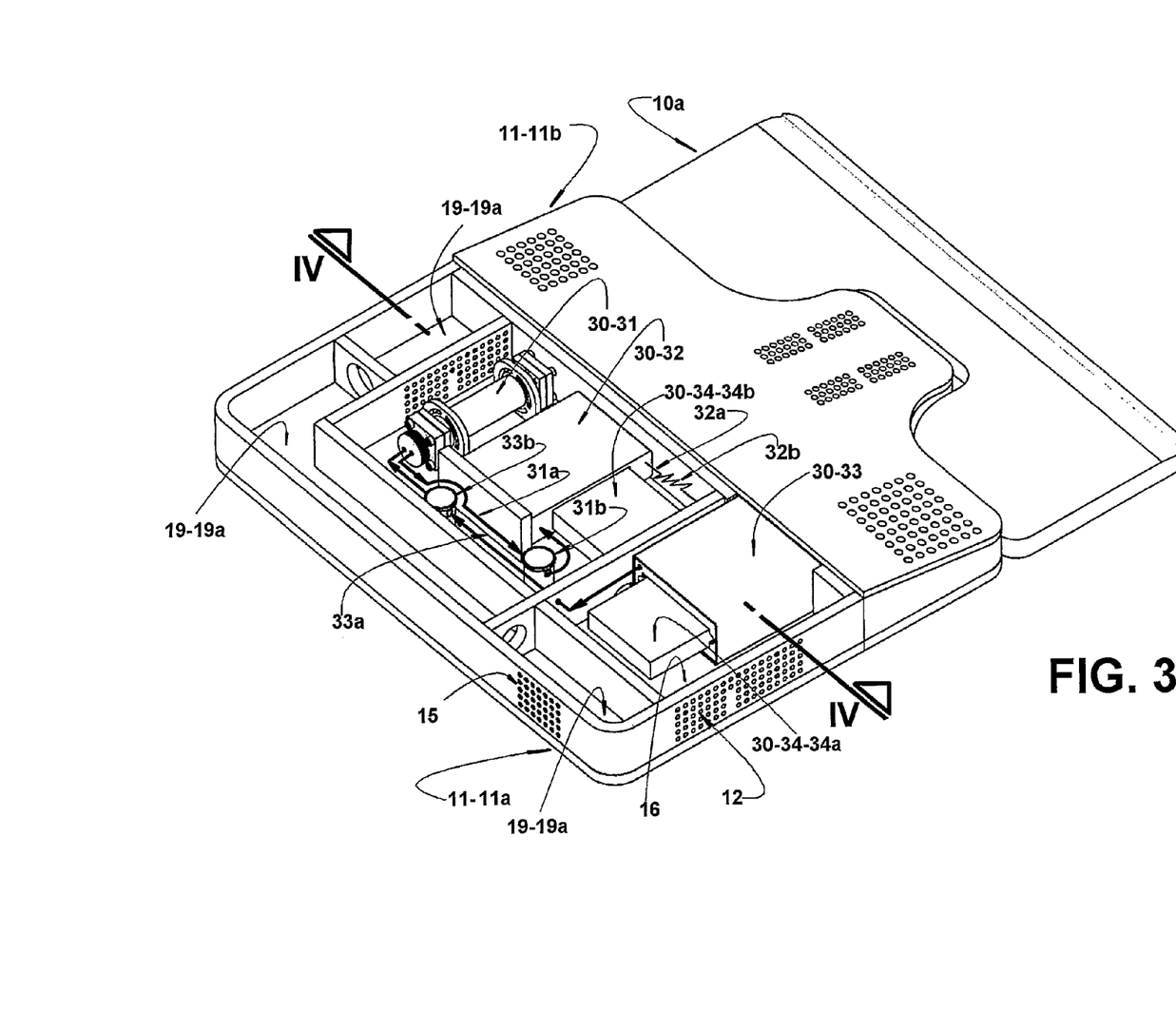
FIG. 3 schematically represents a partially sectioned top perspective view of the docking station illustrated in FIGS. 1A, 1B and 2A.

According to the embodiment schematically illustrated in FIG. 2A, the ventilation means 34 comprises a first fan 34a positioned externally to the casing 11, preferably in the interior of the computer 20. In this construction, the fan of the computer 20 operates as a first fan 34a of the refrigeration system 30, drawing atmospheric air through the air inlet 12, passing it through the interior of the evaporator 33 and through the cooled air outlet 13, so as to produce cooled air flow that is directed to the interior of the computer 20, through an adequate opening (not illustrated) of the latter and conducted to the parts thereof to be cooled. In this embodiment, the ventilation means 34 may further comprise a second fan 34b, in an arrangement already described regarding the second fan 34b of the embodiment of FIGS. 1A, 1B, 2, 3 and 4.

According to the present invention, the docking station 10, includes a plurality of chambers in fluid communication, to house the refrigeration system 30 and define noise muffling chambers, as will be described.

According to a particular way of carrying out the present invention, the docking station 10 comprises, defined in the interior of the casing 11, a first chamber 16 open to the air inlet 12 of the casing 11, housing the first fan 34a only in the embodiment represented in FIGS. 1A, 1B, 2, 3 and 4, and also the evaporator 33, in all the illustrated embodiments, and the first chamber 16 being maintained in fluid communication, through the evaporator 33, with a second chamber 17, open to the cooled air outlet 13.

According to the illustrated construction, the docking station 10 further comprises, in the interior of the casing 11, a third chamber 18, receiving the additional air flow and housing the second fan 34b, the condenser 32 and the compressor 31 and being maintained in fluid communication with the hot air outlet 15.

In a way of carrying out the present invention, the docking station 10 further comprises, in the interior of the casing 11, at least a fourth chamber defining a exhaust chamber 19, establishing fluid communication between the third chamber 18 and the hot air outlet 15.

In the illustrated constructions, the first chamber 16, the third chamber 18 and the fourth chamber 19 are provided in the first portion of the casing 11a and, the second chamber 17, in the second portion of casing 11b. The first chamber 16, the third chamber 18 and the fourth chamber 19 are separated by at least one common dividing wall, provided or incorporated, for example, in a single piece, in other walls of the casing 11.

According to a way of carrying out the present invention, the casing 11 presents at least part of its walls having noise absorbing characteristics, the noise absorbing walls being made or coated with noise absorbing material, such as for example, noise absorbing panels 19b.

In order to minimize the transmission of noise from the compressor 31 under operation to the casing 11 and to the environment external of the docking station 10, the present solution provides said docking station 10 with an exhaust chamber 19, comprising a plurality of muffling chambers 19a, disposed in series and maintained in fluid communication with each other. The muffling chambers 19a are also provided with noise absorbing panels 19b.

In the present solution, at least one of the parts defined by the third chamber 18 and by the muffling chambers is internally provided with noise absorbing panels 19b.

According to a possible constructive form (not illustrated) of the present invention, the first chamber 16 presents the air inlet 12, the second chamber 17 defines the cooled air outlet 13 and the exhaust chamber 19 presents the hot air outlet 15. In this construction, the ventilation means 34 distributes the air, admitted through the air inlet 12, to the cooled air outlet 13 and to the hot air outlet 15, as there is not provided an additional air inlet 14.

In another way of carrying out the present invention, illustrated in the enclosed drawings and in which the casing 11 presents an additional air inlet 14, through which is admitted the additional air flow in the interior of the casing 11, said additional air inlet 14 is open to the interior of the third chamber 18, which houses the second fan 34b of the ventilation means 34, the condenser 32 and the compressor 31.

In a way of carrying out the present invention, the docking station 10 also comprises a condensate collecting device 40, disposed in the interior of the first chamber 16 of the casing 11 and maintained in fluid communication with a draining device 50, dashed line illustrated in FIG. 4 in the form of a duct or channel which gravitationally conducts the condensate to the exterior of the casing 11. The condensate collecting device 40 and the draining device 50 are designed to prevent the condensation in the evaporator 33 from reaching the inner parts of the docking station 10, damaging it or also the computer 20 or the user operating the latter. In a particular embodiment of the present invention, the condensate collecting device 40 is defined by a collecting tray 41 disposed under the evaporator 33.

In another way of carrying out the present invention, as illustrated in FIG. 4, the docking station 10 includes a condensate collecting device 40, also in the form of a collecting tray 41, disposed under the evaporator 33 and maintained in fluid communication with a condensate evaporating device 60, in the form of an evaporating tray 61 disposed adjacent to the compressor 31, preferably under the latter, in the interior of the third chamber 18. The condensate captured in the collecting tray 41 is gravitationally conducted to the evaporating tray 61 by a duct 70, so that the condensate coming from the evaporator 33 is vaporized by the heat generated by operation of the compressor 31, being then directed to the hot air outlet 15, thus preventing the condensate from reaching inner parts of the docking station 10.

Besides the refrigeration system 30, the present docking station 10 comprises a plurality of peripherals to be used upon installing the computer 20 in the docking station 10, and from the operation of the computer 20. The peripherals to be associated with the docked computer 20 may include, among others, keyboard, multimedia, monitor, etc., which, although not illustrated, are considered as accessories to be connected to the casing 11 of the docking station 10.

While only one exemplary embodiment for the present invention has been illustrated herein, it should be understood that alterations can be made in the form, number and arrangement of the different components involved, without departing from the inventive concept defined in the claims that accompany the present specification.

The invention claimed is:

1. A computer docking station comprising a casing presenting an air inlet open to an external environment, and a cooled air outlet and housing a refrigeration system for cooling an air flow which is caused to pass through the interior of the casing from the air inlet to the cooled air outlet characterized in that said refrigeration system comprises: a compressor pumping a refrigerant fluid through a refrigeration circuit comprising a condenser and an evaporator through which is caused to pass said air flow to be cooled, said cooled air outlet being positioned to direct the cooled air flow to the interior of a computer seated against the docking station said air flow being produced by a ventilation means positioned in the interior of the casing the ventilation means further providing an additional air flow which is caused to pass through the condenser and the compressor in order to be directed to a hot air outlet of the casing, the ventilation means further comprising a first fan producing the forced-air flow which is passed through the evaporator and directed to the cooled air outlet, and a second fan producing the additional forced-air flow, the ventilation means further comprising a first chamber defined in the interior of the casing, open to the air inlet of the casing and housing the first fan and the evaporator and being maintained in fluid communication, through the evaporator with a second chamber open to the cooled air outlet.

2. The docking station, as set forth in claim 1, and further comprising in the interior of the casing, a third chamber, receiving the additional forced-air flow and housing the second fan, the condenser and the compressor and being maintained in fluid communication with the hot air outlet.

3. The docking station, as set forth in claim 2, characterized in that the casing comprises an additional air inlet open to the interior of the third chamber.

4. The docking station, as set forth in claim 3, and further comprising in the interior of the casing at least one exhaust chamber establishing the fluid communication between the third chamber and the hot air outlet.

5. The docking station as set forth in claim 4, characterized in that the exhaust chamber comprises a plurality of muffling chambers disposed in series and maintained in fluid communication with each other.

6. The docking station, as set forth in claim 5, characterized in that at least one of the parts defined by the third chamber and by the muffling chambers is internally provided with noise absorbing panels.

7. A computer docking station comprising a casing presenting an air inlet open to an external environment, and a cooled air outlet and housing a refrigeration system for cooling an air flow which is caused to pass through the interior of the casing from the air inlet to the cooled air outlet characterized in that said refrigeration system comprises: a compressor pumping a refrigerant fluid through a refrigeration circuit comprising a condenser and an evaporator through which is caused to pass said air flow to be cooled, said cooled air outlet being positioned to direct the cooled air flow to the interior of a computer seated against the docking station, in that said air flow is produced by a ventilation means comprising a first fan, positioned externally to the casing and producing the air flow which is passed through the evaporator and directed to the cooled air outlet, the first fan being positioned in the interior of the computer, the ventilation means further comprising a second fan internal to the casing and producing an additional air flow through the compressor and through the condenser, in order to be directed to a hot air outlet of the casing, the air inlet is interiorly provided in the casing, and said casing including a first chamber open to the air inlet of the casing housing the evaporator and being maintained in fluid communication, through the evaporator, with a second chamber, open to the cooled air outlet and said casing including an additional air inlet receiving air flow into the casing.

8. The docking station, as set forth in claim 7, and further comprising, in the interior of the casing, a third chamber, receiving the additional air flow and housing the second fan, the condenser and the compressor and being maintained in fluid communication with the hot air outlet.

9. The docking station, as set forth in claim 8, characterized in that the casing comprises an additional air inlet open to the interior of the third chamber.

10. The docking station, as set forth in claim 8, and further comprising, in the interior of the casing, at least one exhaust chamber establishing the fluid communication between the third chamber and the hot air outlet.

11. The docking station, as set forth in claim 10, characterized in that the exhaust chamber comprises a plurality of muffling chambers disposed in series and maintained in fluid communication with each other.

12. The docking station, as set forth in claim 11, characterized in that at least one of the parts defined by the third chamber and by the muffling chambers is internally provided with noise absorbing panels.

* * * * *